July 16, 1940.
T. H. STONE
2,207,951
AIRCRAFT WING SYSTEM
Filed Aug. 8, 1939
3 Sheets-Sheet 2
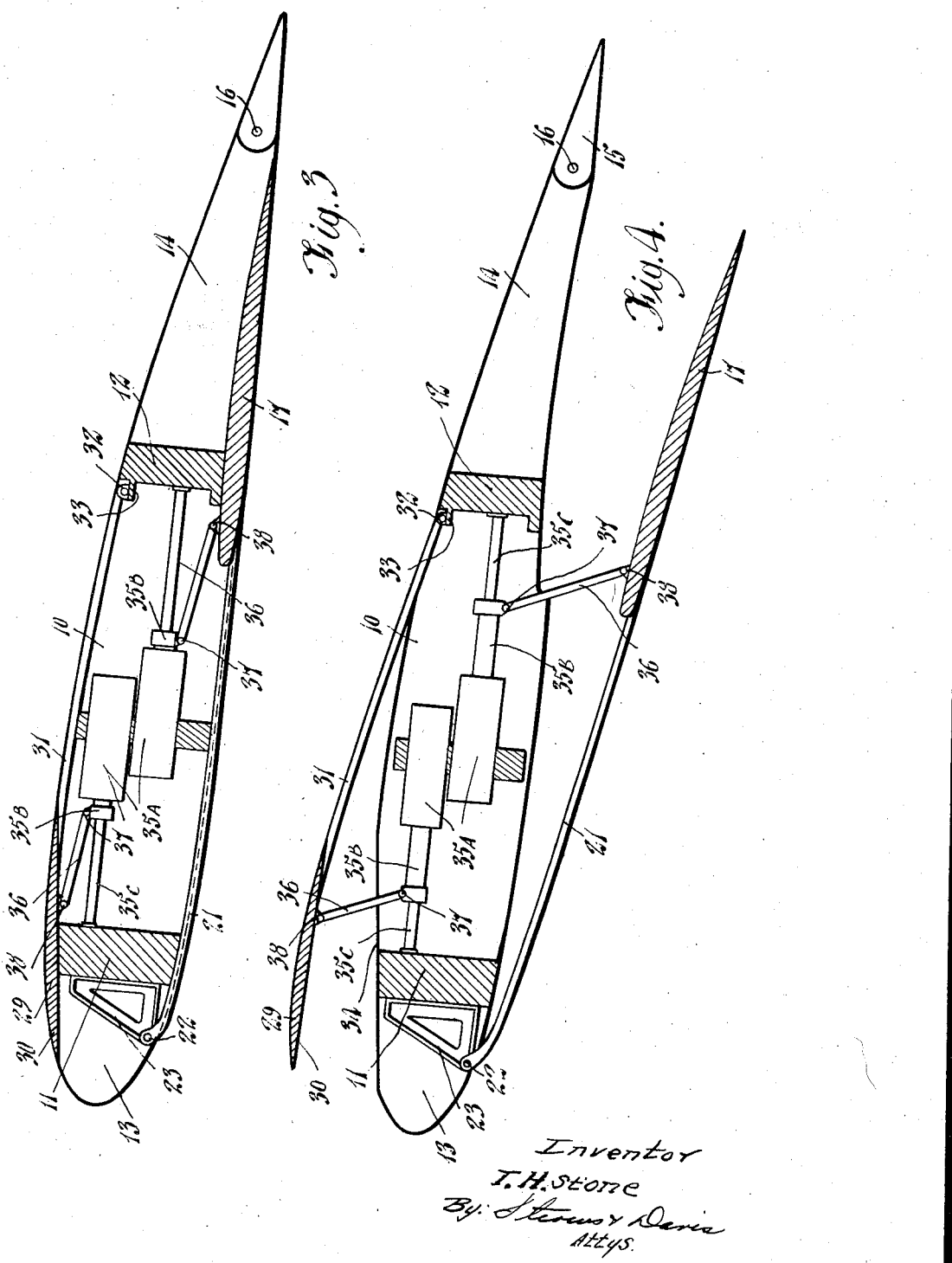
Inventor
T. H. Stone
By Stevens & Davis
Attys.

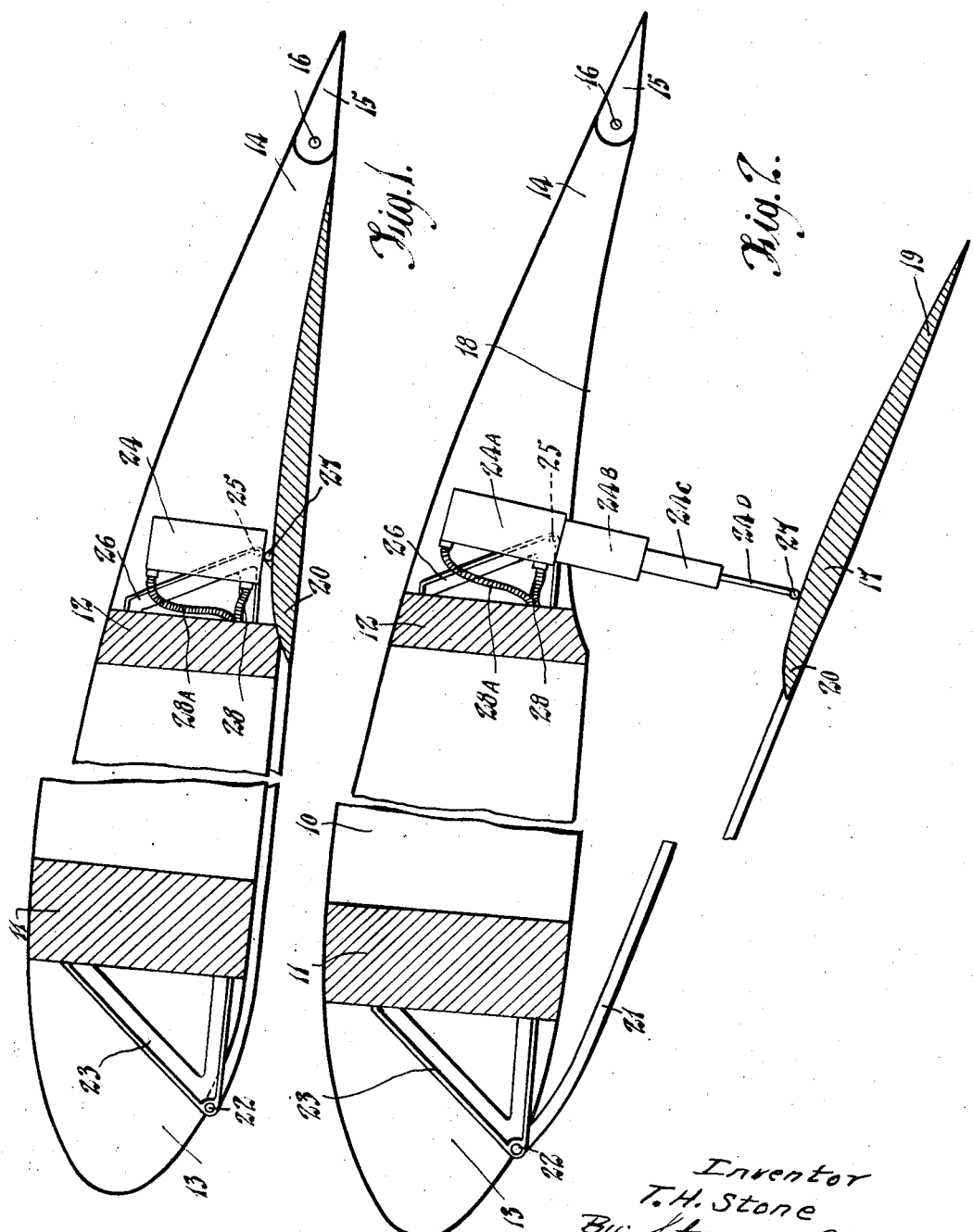

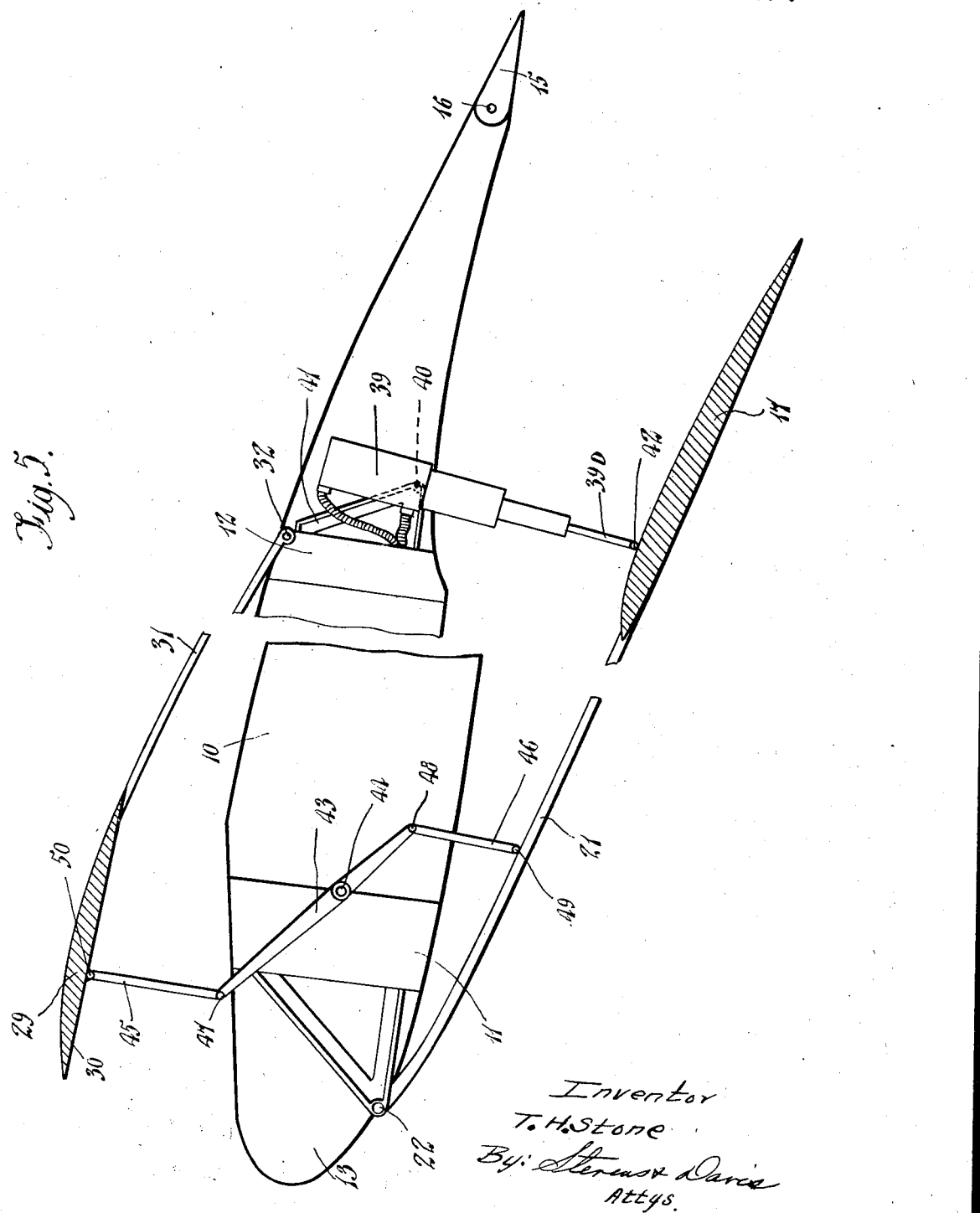

Patented July 16, 1940

2,207,951

UNITED STATES PATENT OFFICE 2,207,951

AIRCRAFT WING SYSTEM

Theodore Handley Stone, Singapore,
Straits Settlements

Application August 8, 1939, Serial No. 289,083
In Great Britain August 2, 1938

8 Claims. (Cl. 244—42)

This invention relates to aircraft wing systems of the kind in which an auxiliary wing is arranged to be projected from a position where it is nested against the upper or lower surface of a main wing in normal flight, to an extended position for the purpose of increasing lift for facilitating take-off and maybe landing of the aircraft. The invention may provide what is generally known as a variable area system in which the effective wing area is increased with or without substantially affecting the aerodynamic characteristics of the main wing.

It has been proposed to provide such a system in which an auxiliary wing normally housed within a main wing, is arranged to be projected spanwise, in which case no substantial variation of the aerodynamic characteristics of the main wing would be effected. In another known arrangement a flap normally nested in a recess on the underside of the trailing edge of the main wing is adapted to be projected rearwardly and at the same time move angularly for incidence increase, so that when extended the whole section of the main supporting wing and its lift and drag characteristics are altered. A further proposal consists in pivotally attaching a flap to the undersurface of a main wing by a pair of links of differing lengths, one of which is pivoted to the leading edge of the flap and the other to the trailing edge, the arrangement providing that when the flap is projected its incidence is increased.

The present invention seeks to provide a variable area wing system adapted to produce an effective increase in lift, preferably without excessive increase in drag, so as to render the system particularly suitable for take-off purposes. A further object of the invention is to provide a system in which the auxiliary wing may, if desired, extend over the whole spanwise width of a main wing without interfering with ailerons and maybe split or other trailing edge flaps provided on the main wing, whilst the invention further seeks to simplify the mounting of the auxiliary wing and the operation thereof.

According to the present invention there is provided an aircraft wing system comprising a main wing carrying an auxiliary wing adapted to be nested against the upper or lower surface of the main wing with one (i. e., the leading or trailing) edge disposed adjacent the corresponding first (i. e., leading or trailing) edge of the main wing, and rigid with chordwise arms which are pivoted to the main wing about an axis fixed relative to the main wing and disposed spanwise thereof, the axis being located nearer to the second (i. e., trailing or leading) edge than to the first edge of the main wing, the chord of the auxiliary wing being less than the chordwise distance between the axis and said first edge, so as to present a gap between the main and auxiliary wings, when the auxiliary wing is moved by operating mechanism away from the main wing by pivoting about the axis. Thus in the case of an auxiliary wing provided below the main wing the axis of pivoting lies at or towards the leading edge of the latter with its trailing edge adjacent the trailing edge of the main wing, whilst where the auxiliary wing is nested on the upper surface of the main wing the pivot axis lies towards the trailing edge. It will be appreciated that in both cases projection of the auxiliary wing from its nested position effects an increase in area of the wing system, whilst the auxiliary wing is subjected to comparative increase in incidence. In certain cases two auxiliary wings may be provided, one above and the other below the main wing, and in such cases an interconnection is provided between the auxiliary wings, whereby aerodynamic force on one assists the operation of the other. The invention preferably provides an arrangement which produces a large increase in effective wing area, and for this purpose the auxiliary wing has a chord which is a substantial fraction, e. g., one third or more, of the main wing chord. In a two spar wing construction a pivot axis may conveniently be constituted by pivot lugs or brackets on the front or rear spar according to whether the auxiliary wing is supported below or above the main wing. The mechanism for projecting and nesting the auxiliary wing may conveniently comprise one or more hydraulic or like fluid pressure jacks.

Preferred embodiments of the invention are illustrated diagrammatically in the accompanying drawings, in which—

Figure 1 shows a main wing section, with a single auxiliary wing housed against its lower surface;

Figure 2 shows the arrangement of Figure 1 with the auxiliary wing projected;

Figure 3 shows a main wing section with two auxiliary wings one nested against its upper surface and the other against its lower surface; and Figure 4 shows the arrangement of Figure 3 with the auxiliary wings projected; whilst Figure 5 shows a modification of the arrangement shown in Figures 3 and 4, with an interconnection between the upper and lower auxiliary wings, whereby aerodynamic forces on the one assist the operation of the other.

In all figures, the main wing section is shown at 10 having front and rear spars diagrammatically illustrated at 11 and 12 respectively. The leading edge portion of the main wing is shown at 13, whilst the trailing edge portion lying to the rear of the spar 12 is indicated at 14. At the trailing edge of the main wing there may be provided an aileron control surface 15 hinged about the axis 16. Such ailerons may conveniently be provided towards the wing tips, whilst inboard thereof split or other trailing edge flaps may be used.

Referring to Figures 1 and 2 the auxiliary wing 17 has a chord of approximately one third the chord of the main wing, and it may extend spanwise of the latter from a point adjacent the fuselage of the aircraft for about two-thirds of the span of the main wing, or if desired throughout the whole span. It will be appreciated that the main and auxiliary wings are symmetrically arranged on each side of the fuselage, whilst the auxiliary wings are adapted to be projected together, so as to provide a symmetrical variation in lift and drag. The auxiliary wing 17 is of aerofoil section, with a substantially flat lower surface which, when the auxiliary wing is accommodated in a recess 18 in the lower surface of the main wing 10, virtually forms a continuation of the lower surface, completing the streamline aerofoil section of the main wing, as seen in Figure 1. When accommodated in the nested position the trailing edge 19 of the auxiliary wing 17 lies adjacent the trailing edge of the main wing, and projecting forwardly from its leading edge 20 are a number of lever arms 21. Although only one such lever arm 21 is visible in the drawings, it will be appreciated that a plurality are provided, arranged parallel with one another and disposed along the span of the auxiliary wing. As shown the lever arm 21, which is rigid with the auxiliary wing 17 projecting beyond its leading edge is pivoted at 22 on a bracket 23 supported by the front spar 11, the pivot axis 22 being closely adjacent the leading edge 13 of the main wing 10. The lever arm 21 is accommodated in a recess chordwise of the main wing, when the auxiliary wing 17 is nested. The means for projecting the auxiliary wing 17 comprises a fluid pressure jack diagrammatically illustrated at 24 (in Figure 1) the body part of which is pivoted at 25 on a bracket 26 carried by the rear spar 12. This jack 24 as seen in Figure 2 is of a telescopic nature comprising three telescoping parts 24A, 24B, 24C and a piston rod 24D pivoted at 27 to the auxiliary wing 17. The fluid pressure, which may conveniently be hydraulic, is supplied through flexible pipelines 28 and 28A from a suitable source. Application of pressure in the pipeline 28A causes extension of the jack, projecting the auxiliary wing in the downward sense away from the main wing by pivoting about the axis 22, whilst the jack 24, being of double-acting form, operates to nest the auxiliary wing when pressure is applied in the pipeline 28. In order to transmit hydraulic pressure to the lower sides of the pistons of the telescopic jack, passages may be formed in the walls of the telescoping parts. Alternatively resilient means, assisted by aerodynamic loads may be utilised to return the auxiliary wing to its nested position. It will be appreciated that when projected to the position indicated in Figure 2 the auxiliary wing substantially increases the effective area of the wing system as a whole, increasing its lift.

Referring to Figures 3 and 4 an auxiliary wing 17 is again provided below the main wing 10 and pivoted about an axis 22 at the leading edge of the latter in a manner similar to that shown in Figures 1 and 2, the lever arm 21 being pin jointed on the bracket 23 about axis 22. A second auxiliary wing 29 of aerofoil section is located with its leading edge 30 adjacent the leading edge 13 of the main wing, whilst lever arms 31 similar to the arms 21 extend in a rearward direction from its trailing edge and are pivoted at 32 to a lug 33 on the rear spar 12. The auxiliary wing 29 is of aerofoil section, with its upper surface of curved form, the curvature constituting a continuation of the curvature of the main wing 10 when the auxiliary wing is nested as shown in Figure 3. The under surface of the auxiliary wing 29 is flat, and the upper surface of the main wing 10 is flattened at 34, so that when nested the auxiliary wing virtually forms part of the aerofoil section of the main wing. The mechanism for effecting the projection of the auxiliary aerofoils 17 and 29 comprises a pair of hydraulic pressure jacks of which the cylinders 35A are fixed in the main wing 10. Each jack comprises a sleeve portion 35B acting as a piston in the cylinder 35A and sliding on a rod 35C secured at one extremity to the front or rear spar 11 or 12 and at its other extremity to the cylinder end. The rod 35C thus forms a rigid beam adequately resisting bending loads produced by aerodynamic forces on the auxiliary wing. The sleeve 35B carries at its extremity within the cylinder 35A a piston operating within the cylinder in a double-acting manner. The sleeves 35B of each jack are connected by links 36 to the corresponding auxiliary wings, the links being pivoted at 37 and 38 respectively to the sleeve and wing. Extension of the jacks by the application of hydraulic pressure in the appropriate sense projects the auxiliary wings 17 and 29 away from the lower and upper surfaces of the main wing to a position such as is indicated in Figure 4. It will be appreciated that aerodynamic forces on the auxiliary wing 29 tend to lift it to its projected position, whilst similar forces on the auxiliary wing 17 oppose the projection, and if desired an interconnection may be provided so that one assists the operation of the other.

Such a modification is illustrated in Figure 5, where the general arrangement of the upper and lower auxiliary wings 29 and 17 is similar to that shown in Figures 3 and 4, the same reference numerals being used to denote like parts. The operation in this case is effected by means of a jack 39 similar to that shown in Figures 1 and 2, the cylinder of which is pivoted at 40 on a bracket 41 supported on the rear spar 12. Its piston rod 39 is pivoted at 42 on the auxiliary wing 17. The jack 39 serves to project and nest both auxiliary wings, and for this purpose an interconnection between the lever arm 21 and the lever arm 31 is provided by means of a lever 43 pivoted at 44 on the front spar 11. Links 45 and 46 pivotally connect the auxiliary wing 29 and arm 21 respectively to the extremities of the lever 43. The distance between the pivot 44 and pivots 47 and 48 by which the links 45 and 46 are connected to the lever 43 is chosen to effect the desired relationship between movement of the auxiliary wings 29 and 17, bearing in mind that the pivot axis 49 of the link 46 to the wing 17 as here shown is nearer the pivot 22 than the pivot axis 50 of the link 45 to the wing 29 is distant from the pivot 32. The aerodynamic forces on the auxiliary wing 29 tend to lift the wing to its projected position, whilst the auxiliary wing 17 is projected against such forces, the interconnection provided by the links 45 and 46 and the pivoted lever 44 operating to balance these forces the one against the other, so that the jack effort necessary for projection may be reduced.

The location of the pivot axis 22 considerably forward of the leading edge 20 of the auxiliary wing 17 in both constructions allows the projection of the auxiliary wing 17 a considerable distance away from the main wing 10 without excessive increase in angle of incidence, so that it may be arranged that the auxiliary wing 17 may be effective for producing lift (not being stalled owing to excessive incidence), whilst being spaced sufficiently far away from the main wing to prevent undesired modification of the characteristics of the main wing. The same applies in the case of the upper wing, where owing to its location it is possible to arrange a slight negative incidence of the auxiliary wing when housed, so that when fully projected it is at a suitable incidence angle.

What I claim is:

1. An aircraft wing system comprising in combination, a main wing having leading and trailing edges, an auxiliary wing having leading and trailing edges and adapted to be nested against the surface of said main wing with the trailing edge disposed adjacent the trailing edge of the main wing, a spanwise extending wing supporting member located in the leading edge portion of said main wing, a chordwise arm rigid with said auxiliary wing and pivoted to the main wing about an axis located between said wing supporting member and the leading edge of the main wing, the chord of the auxiliary wing being less than the chordwise length of said arm, and operating mechanism for moving said auxiliary wing about said axis.

2. An aircraft wing system comprising, a main wing having leading and trailing edges, a first auxiliary wing having leading and trailing edges and adapted to be nested against the upper surface of said main wing with its leading edge adjacent the leading edge of said main wing, a chordwise arm rigid with said first auxiliary wing and pivoted to the main wing about a first fixed axis disposed spanwise of the main wing and located nearer to the trailing edge thereof than to the leading edge, the chord of said first auxiliary wing being less than the length of its respective chordwise arm, a second auxiliary wing having leading and trailing edges and adapted to be nested against the lower surface of said main wing with the trailing edge disposed adjacent the trailing edge of the main wing, a spanwise extending spar located in the leading edge portion of said main wing, a chordwise arm rigid with said second auxiliary wing and pivoted to the main wing about an axis located between said spar and the leading edge of said main wing, the chord of the second auxiliary wing being less than the chordwise length of its respective arm, and operating mechanism for moving said auxiliary wings away from the main wing by a pivotal movement about said axes so as to present gaps between the main and auxiliary wings.

3. An aircraft wing system as claimed in claim 2 further comprising, an interconnection between the auxiliary wings whereby aerodynamic forces on one wing may assist in effecting the movement of the other.

4. An aircraft wing system comprising in combination, a main wing having leading and trailing edges, an auxiliary wing having leading and trailing edges and adapted to be nested against the surface of said main wing with the trailing edge disposed adjacent the trailing edge of the main wing, a spanwise extending spar located in the leading edge portion of the main wing, a chordwise arm rigid with said auxiliary wing and pivoted to the main wing about an axis located between said spar and the leading edge of said main wing, the chord of the auxiliary wing being less than the chordwise length of said arm, and operating mechanism for moving said auxiliary wing about said axis.

5. An aircraft wing system as claimed in claim 4 wherein the auxiliary wing when nested forms a continuation of the surface of the main wing to constitute an aerofoil section, and the mechanism for operating the auxiliary wing consists of a telescopic fluid pressure jack, the longitudinal axis of which is disposed at substantially right angles to the plane of the auxiliary wing.

6. An aircraft wing system as claimed in claim 4 having fluid pressure jack means disposed chordwise of the main wing, and linkage mechanism between said jack means and said main wing so as to cause movement of the latter.

7. An aircraft wing system as claimed in claim 2 further comprising, means interconnecting the movements of the auxiliary wings, fluid pressure jack means operating directly on one of said auxiliary wings to effect movement thereof and through said interconnection effecting movement of the other auxiliary wing.

8. An aircraft wing system as set forth in claim 2 wherein the auxiliary wing adapted to be nested with its trailing edge adjacent the trailing edge of the main wing is spaced therefrom sufficiently to enable the use of angularly movable flaps on the trailing edge of the main wing.

THEODORE HANDLEY STONE.